US008296474B2

(12) United States Patent
Hanson et al.

(10) Patent No.: US 8,296,474 B2
(45) Date of Patent: *Oct. 23, 2012

(54) METHOD AND APPARATUS FOR DETECTING THE TYPE OF INTERFACE TO WHICH A PERIPHERAL DEVICE IS CONNECTED

(75) Inventors: Mark T. Hanson, Lynnwood, WA (US); Nathan C. Sherman, Bellevue, WA (US); Lord Nigel Featherston, Redmond, WA (US); Mark W. Casebolt, Seattle, WA (US); Victor P. Drake, Redmond, WA (US); Keith Mullins, Kent, WA (US); David L. Holo, Spanaway, WA (US); Terry M. Lipscomb, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,950

(22) Filed: Dec. 29, 2011

(65) Prior Publication Data
US 2012/0124247 A1 May 17, 2012

Related U.S. Application Data

(63) Continuation of application No. 13/118,927, filed on May 31, 2011, now Pat. No. 8,112,556, which is a continuation of application No. 12/817,332, filed on Jun. 17, 2010, now Pat. No. 7,975,078, which is a continuation of application No. 11/872,945, filed on Oct. 16, 2007, now Pat. No. 7,779,171, which is a continuation of application No. 11/507,049, filed on Aug. 18, 2006, now Pat. No. 7,277,966, which is a continuation of application No. 10/850,564, filed on May 20, 2004, now Pat. No. 7,096,435, which is a continuation of application No. 10/260,188, filed on Sep. 30, 2002, now Pat. No. 6,795,949, which is a continuation of application No. 09/410,413, filed on Oct. 1, 1999, now Pat. No. 6,442,734, which is a continuation-in-part of application No. 09/112,171, filed on Jul. 8, 1998, now Pat. No. 6,460,094.

(51) Int. Cl.
*G06F 3/00* (2006.01)
(52) U.S. Cl. ............. 710/16; 710/1; 710/8; 710/15; 710/104; 713/100
(58) Field of Classification Search .............. 710/1, 8, 710/15, 16, 104; 713/100
See application file for complete search history.

(56) References Cited

U.S. PATENT DOCUMENTS
4,500,933 A 2/1985 Chan
(Continued)

FOREIGN PATENT DOCUMENTS
EP 0860781 A2 8/1998
(Continued)

OTHER PUBLICATIONS

Universal Serial Bus Specification, Rev. 1.1, Section 7.2.5: Device Speech Identification pp. 113 and 114, Sep. 23, 1998.
(Continued)

*Primary Examiner* — Henry Tsai
*Assistant Examiner* — Aurangzeb Hassan
(74) *Attorney, Agent, or Firm* — Westman, Champlin & Kelly, P.A.

(57) ABSTRACT

A peripheral device is connectable to a computer having one of a first interface and a second interface. The first interface communicates with the peripheral device over a differential data connection having a first data conductor and a second data conductor. The second interface communicates with the peripheral device over a clock conductor and a single ended data connection which includes a data conductor. The peripheral device has first and second communication conductors. The peripheral device includes an interface detection component coupled to the first and second communication conductors and configured to detect which of the first and second interfaces the peripheral device is connected to.

11 Claims, 7 Drawing Sheets

U.S. PATENT DOCUMENTS

| | | | |
|---|---|---|---|
| 4,785,469 A | 11/1988 | Joshi |
| 5,043,938 A | 8/1991 | Ebersole |
| 5,473,264 A | 12/1995 | Mader |
| 5,481,696 A | 1/1996 | Lomp |
| 5,548,782 A | 8/1996 | Michael |
| 5,574,859 A | 11/1996 | Yeh |
| 5,577,213 A | 11/1996 | Avery |
| 5,586,268 A | 12/1996 | Chen |
| 5,606,672 A | 2/1997 | Wade |
| 5,612,634 A | 3/1997 | MacKenna |
| 5,615,344 A | 3/1997 | Corder |
| 5,644,790 A | 7/1997 | Li |
| 5,671,355 A | 9/1997 | Collins |
| 5,754,890 A | 5/1998 | Holmdahl |
| 5,793,999 A | 8/1998 | Mori |
| 5,828,905 A | 10/1998 | Rao |
| 5,832,244 A | 11/1998 | Jolley |
| 5,841,424 A | 11/1998 | Kikinis |
| 5,857,112 A | 1/1999 | Hashemi |
| 5,928,347 A | 7/1999 | Jones |
| 5,935,224 A | 8/1999 | Svancarek |
| 5,969,529 A | 10/1999 | Eiraku |
| 6,006,295 A | 12/1999 | Jones |
| 6,012,103 A | 1/2000 | Sartore |
| 6,094,063 A | 7/2000 | St. Pierre |
| 6,151,647 A | 11/2000 | Sarat |
| 6,442,734 B1 | 8/2002 | Hanson |
| 6,460,094 B1 | 10/2002 | Hanson |
| 6,625,790 B1 | 9/2003 | Casebolt |
| 6,795,949 B2 | 9/2004 | Hanson |
| 6,886,052 B2 | 4/2005 | Chiu |
| 7,096,435 B2 | 8/2006 | Hanson |
| 7,277,966 B2 | 10/2007 | Hanson |
| 7,779,171 B2 | 8/2010 | Hanson |
| 7,975,078 B2 | 7/2011 | Hanson |

FOREIGN PATENT DOCUMENTS

| | | |
|---|---|---|
| TW | 88102655 | 2/1999 |
| TW | 144462 | 10/2001 |
| TW | 459196 | 11/2001 |
| WO | 9717214 | 5/1997 |
| WO | 9731386 | 8/1997 |
| WO | 0014644 | 3/2000 |

OTHER PUBLICATIONS

PCT/US00/27001 International Search Report mailed Jan. 17, 2001.
Prosecution History of US Patent No. 6,442,734, issued Aug. 27, 2002.
Prosecution History of US Patent No. 6,460,094, issued Oct. 1, 2002.
Prosecution History of US Patent No. 6,625,790, issued Sep. 23, 2003.
Prosecution History of US Patent No. 6,795,949, issued Sep. 21, 2004.
Prosecution History of U.S. Appl. No. 11/872,945, filed Oct. 16, 2007, now US Patent No. 7,779,171.
Prosecution History of U.S. Appl. No. 12/817,332, filed Jun. 17, 2010, now US Patent No. 7,975,078.
Prosecution History of U.S. Appl. No. 13/118,927, filed May 31, 2011.

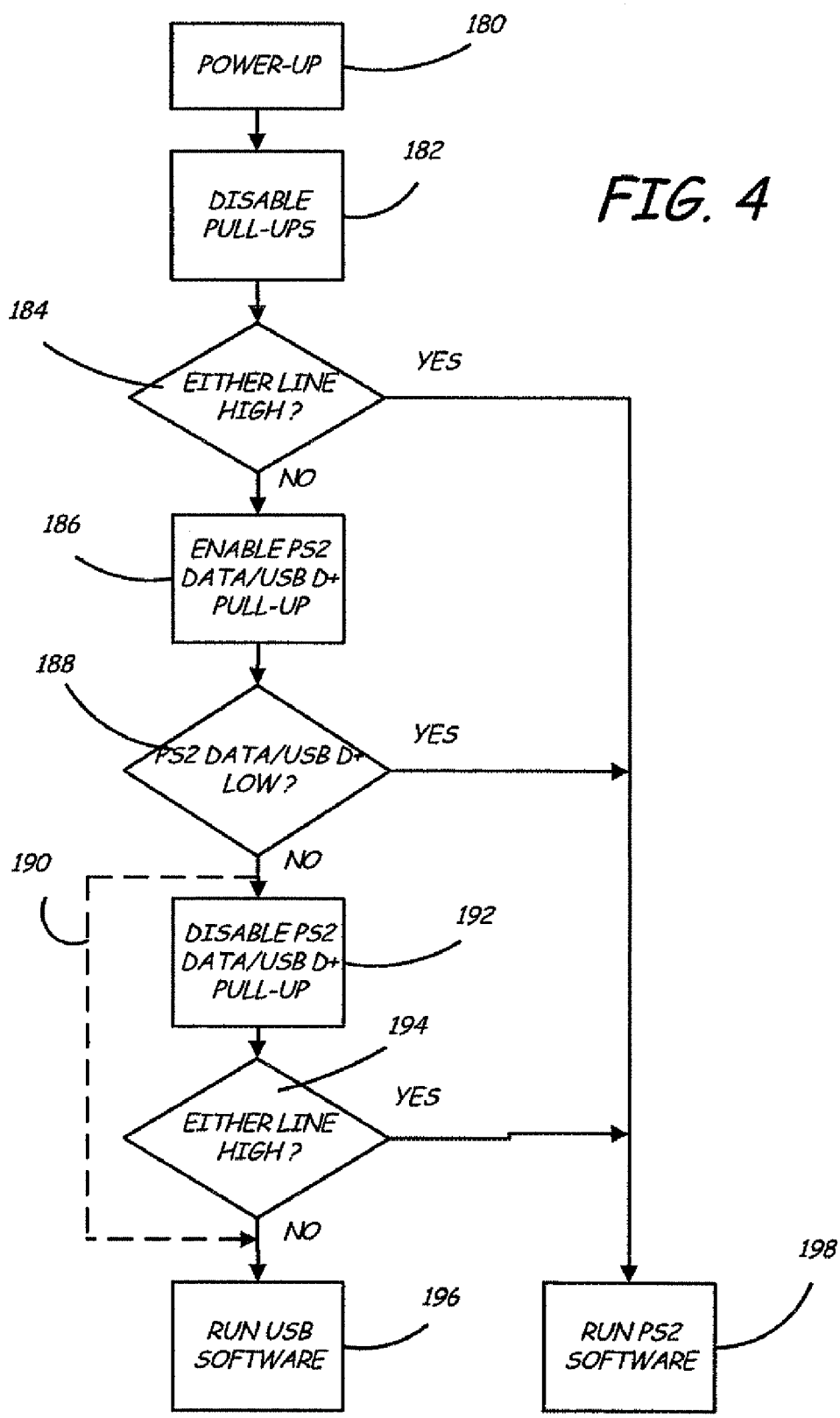

METHOD AND APPARATUS FOR DETECTING THE TYPE OF INTERFACE TO WHICH A PERIPHERAL DEVICE IS CONNECTED

CROSS-REFERENCE TO RELATED APPLICATION

This is a continuation of application Ser. No. 13/118,927 filed May 31, 2011, which is a continuation of application Ser. No. 12/817,332 filed Jun. 17, 2010, now U.S. Pat. No. 7,975,078, which is a continuation of application Ser. No. 11/872,945 filed Oct. 16, 2007, now U.S. Pat. No. 7,779,171, which is a continuation of application Ser. No. 11/507,049, filed Aug. 18, 2006, now U.S. Pat. No. 7,277,966, which is a continuation of the application Ser. No. 10/850,564, filed May 20, 2004, now U.S. Pat. No. 7,096,435, which is a continuation of application Ser. No. 10/260,188, filed Sep. 30, 2002, now U.S. Pat. No. 6,795,949, which is a continuation of application Ser. No. 09/410,413, filed on Oct. 1, 1999, now U.S. Pat. No. 6,442,734, which is a continuation-in-part of application Ser. No. 09/112,171, filed on Jul. 8, 1998, now U.S. Pat. No. 6,460,094, and assigned to the same assignee as the present application, and which are hereby incorporated by reference, and from which priority is claimed.

BACKGROUND

The present invention relates to a peripheral device connectable to a computer. More particularly, the present invention relates to a peripheral device configured to detect the type of interface to which it is connected.

A wide variety of peripheral devices are currently configured to be connectable to computers. Such peripheral devices commonly include user input devices, such as keyboards, point and click devices (traditionally referred to as a computer mouse) and other similar types of devices.

The computer to which such devices are connected communicates with the devices through one of a number of interfaces. Interfaces commonly used to connect to such peripheral devices include a serial interface (such as an RS232 interface) and a PS2 interface. Indeed, the PS2 interface has long been a standard for connecting keyboards and mice to computers.

However, recently, another serial interface referred to as a universal serial bus (USB) interface has been introduced. The USB interface accommodates a wide variety of computer peripherals, including keyboards and mice. However, a conventional computer is typically provided with only one interface (such as a PS2 or USB interface) for communication with peripheral devices. Therefore, if the computer is provided with a PS2 interface, the keyboard or mouse must be configured to support communication with the computer according to a protocol defined by the PS2 interface. Similarly, if the computer is provided with the USB interface, the keyboard or mouse must be configured to communicate according to a protocol defined by the USB interface.

In order to do this, a conventional computer peripheral device contains a microprocessor which runs a software program to carry out the functions of that particular peripheral device. In the device such as a keyboard or mouse, the software program includes an interface between the peripheral device and the host computer, through which the peripheral device communicates with the host computer. Such communication often includes receiving commands from the host computer and transmitting data and status information to the host computer.

As discussed above, the PS2 and USB interfaces have different hardware and software requirements, which must be met by the microprocessor in the peripheral device so that the peripheral device can communicate with the host computer. The PS2 interface uses two conductors which include a separate clock conductor and a separate data conductor. These conductors are driven by the computer through an open-collector or open-drain circuit, and have a pull-up resistor (typically in the range of 2 k ohms to 10 k ohms) pulling the conductor to a rail voltage (such as VCC) inside the host computer. The open-collector or open-drain circuit (commonly a transistor) is typically implemented inside the microprocessor. Another pull-up resistor is required inside the peripheral device as well. The peripheral device communicating over a PS2 interface is responsible for providing a clock signal on the clock conductor, regardless of the direction of data flow on the data conductor. The host computer pulls the clock conductor to a logic low level to inhibit communication from the peripheral device, and it can also pull the data conductor low to signal to the peripheral device that the host computer intends to transmit data to the peripheral device.

The USB interface also uses two conductors which include differential data signal conductors D+ and D−. In the USB interface at the USB port (i.e., at the host computer or USB hub), the two conductors are pulled to a logic low level via 15 k ohm resistors. In the peripheral device, the D+ conductor is pulled to approximately 3.3 volts via a 1.5 k ohm resistor if the peripheral device is a high-speed USB peripheral device. The D− conductor is pulled to 3.3 volts via a 1.5 k ohm resistor if the peripheral device is a low-speed USB peripheral device. When a peripheral device is attached to the USB port, the USB host determines whether it is a low-speed or high-speed device by determining which of the D+ or D− conductors is pulled to the logical high level.

Thus, it can be seen that the two interfaces have different hardware structures, and communicate using different software protocols. Traditionally, separate peripheral devices have been provided, one being configured to communicate with a USB interface, and the other being configured to communicate with a PS2 interface. This requires the manufacturer of such peripheral devices to offer two different types of peripheral devices in order to support these two different interfaces.

SUMMARY

The present invention defines a method and apparatus in the peripheral device such that the peripheral device can determine which type of interface it is connected to, and configure itself accordingly.

The peripheral device is connectable to a computer having one of a first interface and a second interface. The first interface communicates with a peripheral device over a differential data connection having a first data conductor and a second data conductor. The second interface communicates with the peripheral device over a clock conductor and a single-ended data connection, which includes a data conductor. The peripheral device has first and second communication conductors configured for connection to the first and second data conductors in the differential data connection and to the first data conductor in the single ended data connection and the clock conductor. The peripheral device includes an interface detection component configured to detect which of the first and second interfaces the peripheral device is connected to.

The peripheral device also includes a controller component configured to communicate between the peripheral device and the computer according to a protocol corresponding to the detected interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 is a flow diagram illustrating operation of a peripheral device in accordance with one aspect of the present invention.

DETAILED DESCRIPTION

The present invention includes a method and apparatus, implemented in a peripheral device, by which the peripheral device detects whether it is coupled to a PS2 interface or a USB interface. A peripheral device, in accordance with one aspect of the present invention, senses the state of the interface, changes a hardware configuration of the interface through software control, and observes the effect of the configuration change on the state of the interface. The nature of changes on the interface allows the peripheral device to determine which type of interface it is connected to, and thus allows the peripheral device to configure itself appropriately.

Figure 1:
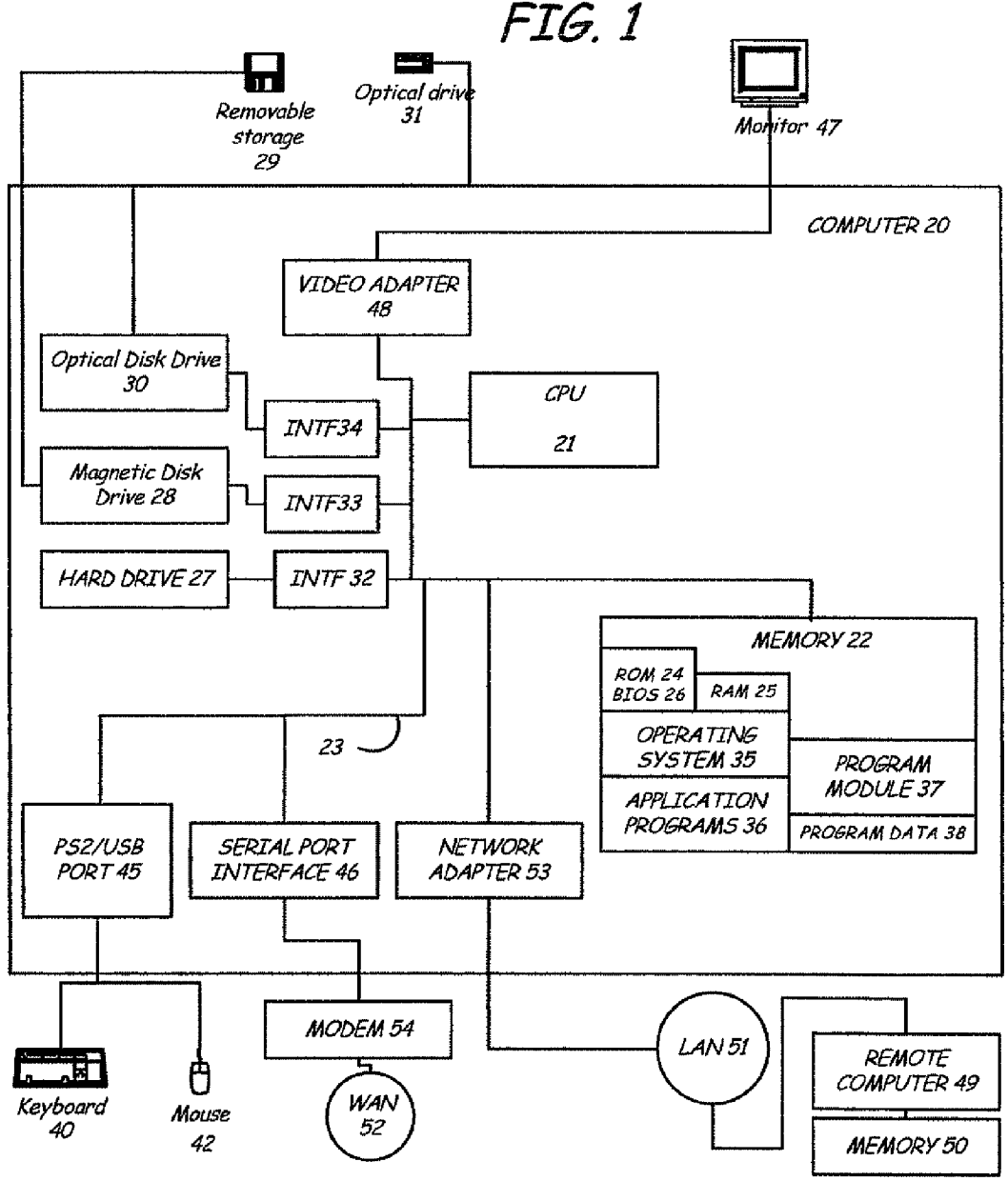
FIG. 1 is a block diagram of an exemplary environment in which an input device in accordance with the present invention can be used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memory (RAM), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (or mouse) 42. Other input devices (not shown) may include a microphone, joystick, game pad, satellite dish, scanner, or the like. These and other input devices are often connected to the processing unit 21 through one of a plurality of ports. For instance, keyboard 40 and mouse 42 are connected through a PS2 or USB interface 45. In the illustrative embodiment, interface (or port) 45 is coupled to the system bus 23. User input devices may also be connected by other interfaces, such as a sound card, a parallel port, or a game port. A monitor 47 or other type of display device is also connected to the system bus 23 via an interface, such as a video adapter 48. In addition to the monitor 47, personal computers may typically include other peripheral output devices such as speakers and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2A:
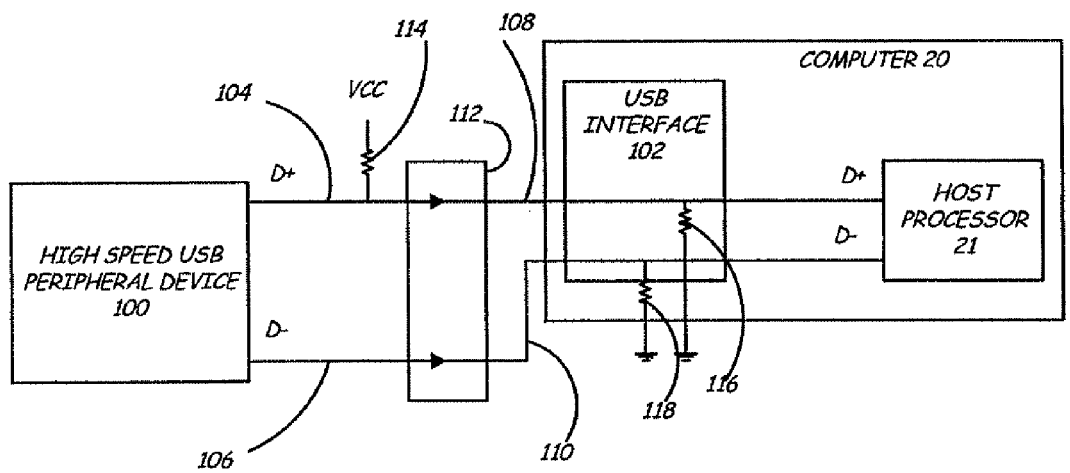
FIGS. 2A-2C illustrate conventional high-speed and low-speed USB peripheral devices and a PS2 peripheral device coupled to a USB interface and a PS2 interface, respectively.
Figure 2B:
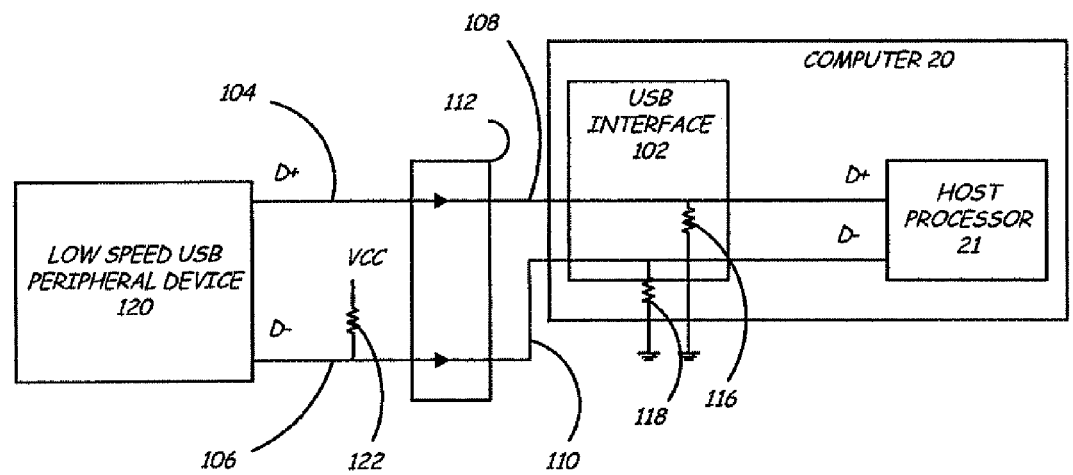
Figure 2C:
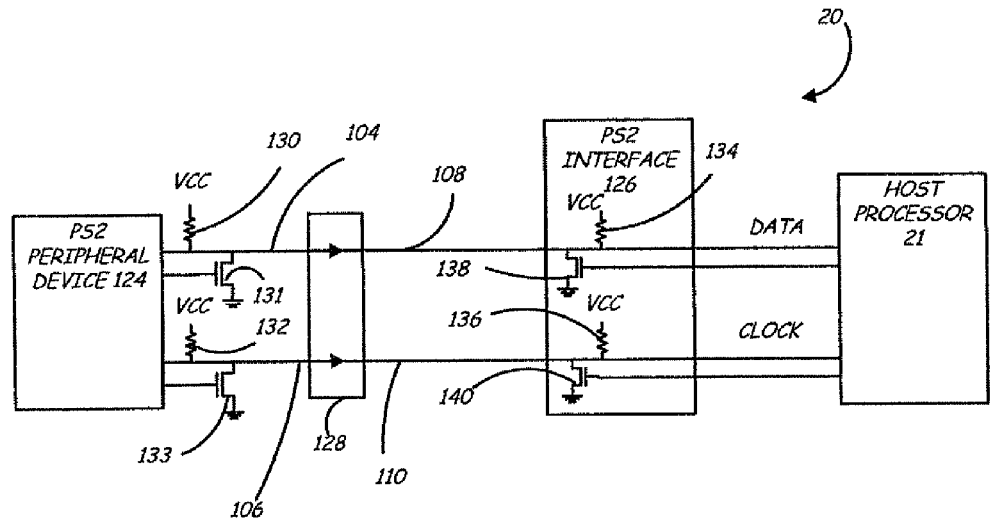

FIGS. 2A-2C illustrate conventional peripheral devices coupled to conventional interfaces. FIG. 2A illustrates a high-speed USB peripheral device 100 connected through USB interface 102 to CPU 21 of host computer 20. It should be noted that high-speed USB peripheral device 100 can be any suitable peripheral device. Peripheral device 100 is connected to USB interface 102 and communicates therewith over two conductors 104 and 106. Conductors 104 and 106 are connected to corresponding conductors 108 and 110 through USB connector 112. Conductors 104 and 106 carry signals denoted D+ and D− in a high-speed USB device. Signals D+ and D− are differential digital data signals with which peripheral device 100 communicates with computer 20.

In a high-speed USB arrangement, conductor 104, which carries signal D+, is pulled to a logical high level (such as VCC) by a pull-up resistor 114. Resistor 114 is preferably valued such that the voltage potential to which conductor 104 is pulled is approximately 3.3 volts. Therefore, resistor 114 can, for instance, be a 7.5 k ohm resistor connected to a 5 volt VCC rail.

In USB interface 102 on computer 20, both conductors 108 and 110 (which correspond to the D+ and D− signals) are pulled to a logic low level by two 15 k ohm resistors 116 and 118. When peripheral device 100 is initially attached to computer 20 through USB interface 102, computer 20 can determine that peripheral device 100 is a high-speed USB peripheral device because the conductor 104 corresponding to signal D+ is pulled to a logical high level, while conductor 106 which corresponds to signal D− is not.

FIG. 2B illustrates the connection of a low-speed USB peripheral device 120 to computer 20. Some items are similar to those shown in FIG. 2A, and are similarly numbered. However, rather than having conductor 104 (corresponding to signal D+) pulled to a logical high level with resistor 114, conductor 106 (which corresponds to signal D−) is pulled to a logical high level with resistor 122. Thus, computer 20 determines that peripheral device 120 is a low-speed USB device.

FIG. 2C illustrates another peripheral device 124 connected to computer 20. Peripheral device 124 is configured to communicate with computer 20 through a PS2 interface 126. PS2 peripheral device 124 communicates with computer 20 over a pair of conductors 104 and 106, which correspond to a data signal and a clock signal. Conductors 104 and 106 are connected to transistors 131 and 133, which are configured as open-collector or open-drain switches controlled by the microprocessor in peripheral device 124. Conductors 104 and 106 are connected to conductors 108 and 110 through PS2 connector 128. Conductors 104 and 106 are pulled to a logical high level at peripheral device 124 by resistors 130 and 132 which are typically in a 2 k-10 k ohm range.

In PS2 interface 126, conductors 108 and 110 are also pulled to a logical high level by resistors 134 and 136, which are also typically in a 2 k-10 k ohm range. Conductors 108 and 110 are also coupled to ground by transistors 138 and 140, which are typically open-drain or open-collector and driven by appropriate circuitry in processor 21. It should also be noted that transistors 138 and 140 can typically be implemented inside processor 21, or discretely.

With the open-collector configured interface, when a logical 1 is written to either conductor 108 or 110, the conductor is not actively driven high. Instead, it is pulled high, to nearly the rail voltage VCC, via the pull-up resistors 134 and 136. In this manner, either host processor 21 or peripheral device 124 can drive the conductor low without the concern of the conductor already being actively driven high.

Peripheral device 124 is responsible for providing the clock signal over conductors 106 and 110, to host processor 21, regardless of the direction of data flow over conductors 104 and 108. Host processor 21 can pull the conductor 110 carrying the clock signal low by controlling transistor 140 appropriately. This inhibits communication from peripheral device 124. Host processor 21 can also pull the data conductor 108 low by manipulating transistor 138 in order to signal peripheral device 124 that host processor 21 intends to transmit data.

Figure 3A:
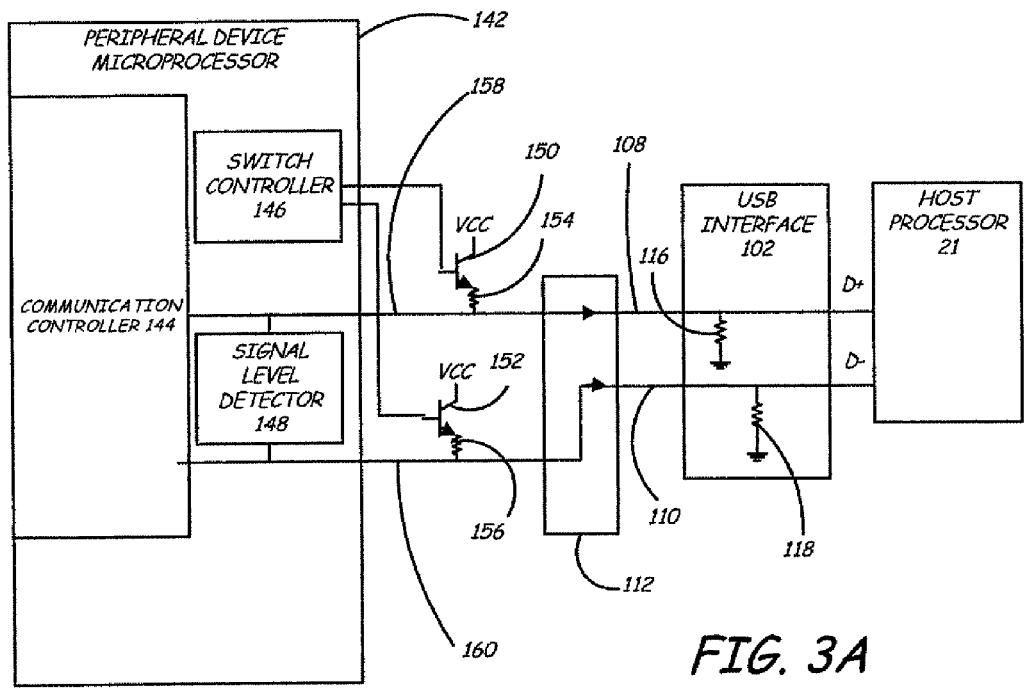
FIGS. 3A and 3B illustrate a peripheral device in accordance with the present invention coupled to a USB interface and a PS2 interface, respectively.

FIG. 3A illustrates host computer 20 coupled to a peripheral device 142 in accordance with one aspect of the present invention. A number of items are similar to those shown in FIGS. 2A-2C, and are similarly numbered. Also, in FIG. 3A, computer 20 is provided with USB interface 102, rather than PS2 interface 126.

Peripheral device 142 includes communication controller 144, switch controller 146, and signal level detector 148. Peripheral device 142 is also coupled to first switch 150 and second switch 152. Switches 150 and 152 are coupled to a rail voltage VCC, and to pull-up resistors 154 and 156 which are, in turn, coupled to conductors 158 and 160. Conductors 158 and 160 are provided to connector 112 for connection to conductors 108 and 110 at computer 20.

Figure 3B:
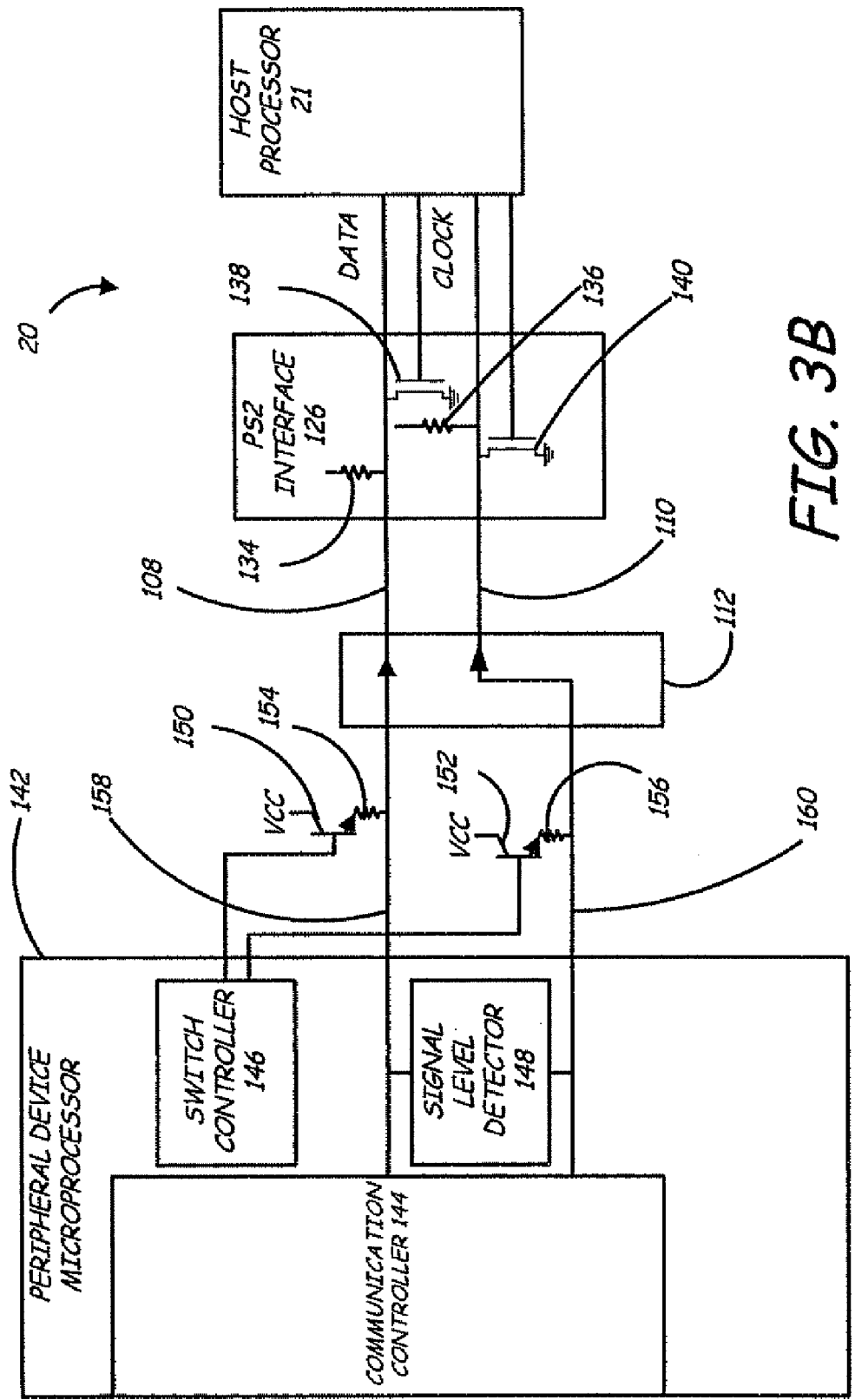

FIG. 3B shows peripheral device 142 coupled to host computer 20. In FIG. 3B, host computer 20 is provided with PS2 interface 126, rather than USB interface 102. It should be noted that, regardless of the particular interface 102 or 126 with which host computer 20 is provided, peripheral device 142 is the same.

In accordance with one aspect of the present invention, pull-up resistors 154 and 156 are switched on and off under the control of switch controller 146, which is preferably implemented in the microprocessor of peripheral device 142. While transistors 150 and 152 are shown as discrete switching transistors, they can also be implemented within the microprocessor of peripheral device 142, such that the side of resistor 154 coupled to switch 150 can be connected directly to an input pin of the microprocessor in peripheral device 142, as can the side of resistor 156 coupled to switch 152. Further, while switches 150 and 152 are illustrated as bipolar junction transistors, other switch mechanisms can be used as well, such as field effect transistors, relays, etc.

It should also be noted that the data signal of PS2 interface 126 and the D+ signal of the USB interface 102 are coupled to conductor 158, and the PS2 clock signal and the D− signal are coupled to conductor 160. Thus, peripheral device 142 can operate as a high-speed USB peripheral device or as a PS2 device. The relationship between the signals is reversed (i.e., the D+ and D− signals are reversed with respect to the PS2 clock and data signals) when peripheral device 142 is configured to operate as a low-speed USB peripheral device or a PS2 device. Further, these relationships could be reversed. An adapter is preferably provided in connector 112 to accommodate different connections used for the PS2 and the two types of USB interfaces.

FIG. 4 is a flow diagram, which illustrates the operation of peripheral device 142. Upon being connected to computer 20, peripheral device 142 receives power from computer 20. Power-up of peripheral device 142 is illustrated by block 180. Switch controller 146 in peripheral device 142 then turns off both switches 150 and 152. This disables pull-up resistors 154 and 156 from pulling conductors 158 and 160 to a logical high voltage potential, effectively disconnecting resistors 154 and 156 from the rail voltage VCC. Disabling the pull-ups is indicated by block 182 in FIG. 4.

Signal level detector 148 then detects whether the signal level on either conductor 158 or 160 is at a logical high level. Signal level detector 148 can be any suitable signal level detector. This is indicated by block 184.

If either or both conductors 158 or 160 are carrying a logical high signal, peripheral device 142 concludes that it is connected to a PS2 interface 126, rather than a USB interface 102. This is because, with pull-up resistors 154 and 156 disabled, the pull-down resistors 116 and 118 in USB interface 102 would tend to pull conductors 108 and 110 (and hence conductors 158 and 160) to a logical low level. Therefore, if either of the conductors are at a logical high level, the conductors are being pulled high by resistors 134 and 136 in the PS2 interface 126.

However, if both conductors are low, peripheral device 142 cannot yet determine which type of interface it is connected to. For example, in the USB interface 102, pull-down resistors 116 and 118 could be pulling the conductors to a logic low level. However, it is also valid for PS2 interface 126 to have switches 138 and 140 energized thus driving the conductors carrying both the data and clock signals to a logical low level. Therefore, upon power-up and disabling of pull-up resistors 154 and 156, if the signals on both conductors 158 and 160 are at a logical low level, peripheral device 142 needs to take additional steps to determine which type of interface it is connected to.

Switch controller 146 then turns on switch 150 to enable pull-up resistor 154. It should be noted that the particular pull-up resistor enabled at this point is that pull-up resistor which is connected to the PS2 data conductor and the USB D+ conductor for a high-speed USB device, or the PS2 data conductor and the USB D− conductor for a low-speed USB device. The flow diagram illustrated in FIG. 4 illustrates operation of the PS2/high-speed USB peripheral device.

In any case, once pull-up resistor 154 is enabled by switch controller 146 turning on switch 150, signal level detector 148 again looks at the signal level on conductor 158. If that signal stays at a logical low level, peripheral device 142 can safely conclude that it is connected to PS2 port 126, rather than a USB port 102. This is because, with pull-up resistor 154 enabled, in order for there to be a logical low level signal on conductor 158, conductor 158 must be positively driven to a low level by transistor 138 in PS2 interface 126. The enabled pull-up resistor 154 would otherwise pull conductor 158 to a logical high level if it had been connected to USB interface 102.

Enabling pull-up resistor 154 and detecting the signal level on conductor 158 is indicated by blocks 186 and 188 in FIG. 4.

If, on the other hand, after the pull-up resistor 154 is enabled, the associated conductor is not at a logical low level, then peripheral device 142 is probably connected to a USB interface 102. This assumption can be made most of the time, and thus peripheral device 142 can optionally stop the detection algorithm at this point and run the USB software. This is indicated by dashed arrow 190 in FIG. 4.

However, there is a small chance that peripheral device 142 could be connected to a PS2 interface 126 wherein the host processor 21 coincidentally allowed the data signal to go to a logical high level at the same instant that switch controller 146 enabled pull-up resistor 154. Peripheral device 142 can thus take additional steps to further ensure that its determination as to the type of interface is correct. In that instance, switch controller 146 disables pull-up resistor 154, and signal level detector 148 then determines whether the signal level on either of conductors 158 or 160 is at a logical high level. This is indicated by blocks 192 and 194 in FIG. 4.

If either conductor is at a logical high level, then peripheral device 142 can safely assume that it is connected to a PS2 interface 126, rather than a USB interface 102. If, on the other hand, neither of the conductors is at a logical high level, peripheral device 142 can assume that it is connected to USB interface 102, rather than a PS2 interface 126. In addition, peripheral device 142 can safely conclude that it is connected to a PS2 device if, at any time, it is determined that the PS2 clock signal has assumed a logical high level.

The probability of a second, coincidental switching by the host processor 21 of the data signal back to a logical low level at the same instant that the switch controller 146 disables the pull-up resistor 146 is very low, since such a reversal, namely, data signal low to high to low, while the clock signal remains low, is a violation of the PS2 protocol.

Once the peripheral device 142 has determined which type of interface it is connected to, it branches to a portion of its software code that supports that type of interface and the code operates to turn on resistors appropriate to the detected interface. This is indicated by blocks 196 and 198 in FIG. 4.

It should be noted that while FIG. 4 has been described with respect to testing of the conductor carrying the PS2 data signal, the present invention can be carried out by testing the conductor carrying the PS2 clock signal instead. The process is the same.

Figure 5:
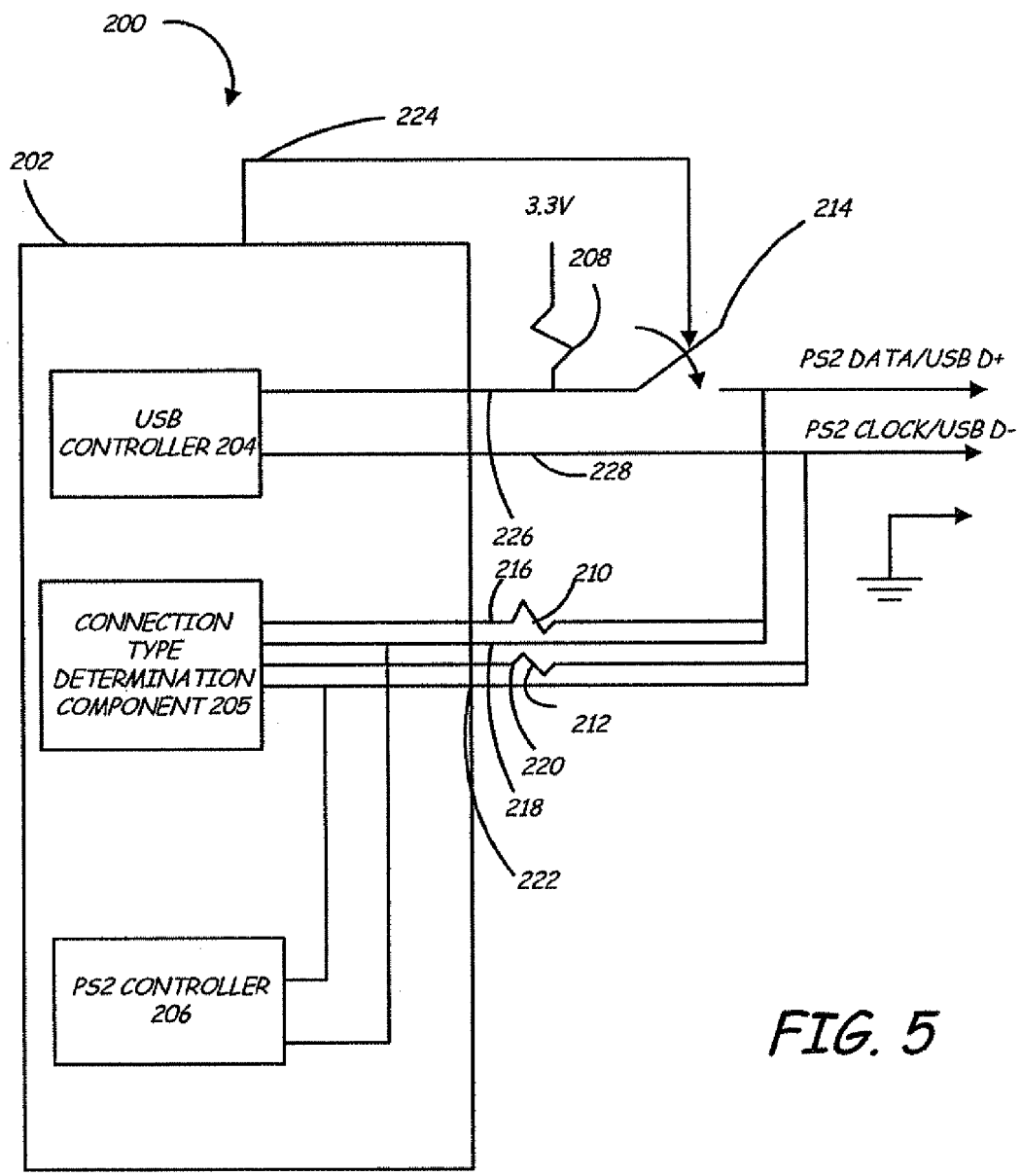
FIG. 5 is a block diagram illustrating another embodiment in accordance with one aspect of the present invention.

FIG. 5 is a block diagram of another peripheral device 200 in accordance with another aspect of the present invention. Peripheral device 200 includes USB microcontroller 202 which includes USB controller component 204, connection type determination component 205 and PS2 controller component 206. Peripheral device 200 also includes pull up resistor 208, resistors 210 and 212, and switch 214. Microcontroller 200 also includes a plurality of input/output (I/O) pins 216, 218, 220, 222 and 224.

Microcontroller 202 also includes USB differential data outputs D+ and D− provided on pins 226 and 228. The D+ and D− pins 226 and 228 are coupled to conductors which represent USB D+ and USB D− signals for a high-speed USB device, and PS2 data and PS2 clock signals, respectively, for a PS2 device.

When peripheral device 200 is attached to host processor 21 through either PS2 interface 126 or USB interface 102, connection type determination component 205 determines what type of interface peripheral device 200 is connected to. Microcontroller 202 is powered up and initially provides a signal on I/O pin 224 causing switch 214 to remain open. Component 205 first examines pin 218 to determine the level of the signal on pin 218. If the signal level is at a logic one (or logical high level), component 205 determines that peripheral device 200 is connected to a PS2 interface 126. This is because, with switch 214 open, and pin 218 at a logical high level, the signal level must be being pulled high by the pull up resistor in the PS2 interface.

On the other hand, if the signal level on pin 218 is still at a logical zero (or a logical low level) the component 205 provides a logical high output on pin 216. This essentially enables pull up resistor 210. Component 205 then again examines the signal level on pin 218. If the signal is at a logical low level, the signal is being actively driven low by the interface to the host system. Thus, the interface must be a PS2 interface. However, if the signal is pulled up to a logical high level, then the interface is determined to be a USB interface.

If the interface to which peripheral device 200 is connected is determined to be a USB interface, then USB controller 204 provides a signal on pin 224 causing switch 214 to be closed. In addition, microcontroller 202 provides pins 216, 218, 220 and 222 in a high impedance state. USB controller component 204 then simply controls communication with the host system according to a USB protocol using differential data D+ and D−.

If, on the other hand, the interface is determined to be a PS2 interface, then switch 214 is maintained in the open position and microcontroller 202 provides signals on pins 216 and 220 in a logical high level thus enabling pull up resistors 210 and 212 (both of which are illustratively 2.2 k ohms) PS2 controller component 206 then controls communications using pins 218 and 222 as the PS2 data and PS2 clock lines, respectively.

It should be noted that some USB devices have a serial interface engine which is permanently enabled. A condition in which both differential data signals D+ and D− go to a logical zero causes the part to reset itself. By providing switch 214, with pull up resistor 208, the present invention ensures that when switch 214 is open, the D+ signal to USB controller 204 is always maintained at a logical high level.

Further, other USB controllers 204 may require both the differential data signals D+ and D− to be disconnected when PS2 controller 206 is controlling communication with the PS2 interface. In that case, an additional switch is placed in the D− conductor and is maintained in the open position during determination of the connection type, and during communication if the interface type is determined to be a PS2 interface. If, on the other hand, the interface type is determined to be a USB interface, the switches are both closed and USB controller 204 controls communication according to the USB protocol.

In a recent revision to the standard USB specification, a change was made which requires a USB hub device, after receiving a Bus Reset and prior to configuration, to drive a logic low 0 on its down stream ports. On hubs which implement power switching, this change does not present a problem because power is not supplied down stream of the hub device until after the hub device has been configured.

However, self powered hubs (particularly root hubs) are not required to implement power switching. Therefore, there is a possibility that power is present and that D+ and D− are driven to 0 on a USB port with no device attached. This may be the state of the port when the present detection algorithm is invoked (i.e., upon power-up or attachment). Therefore, it may be desirable for the algorithm not to assume, under these circumstances, that the device is attached to a PS2 port.

Figure 6:
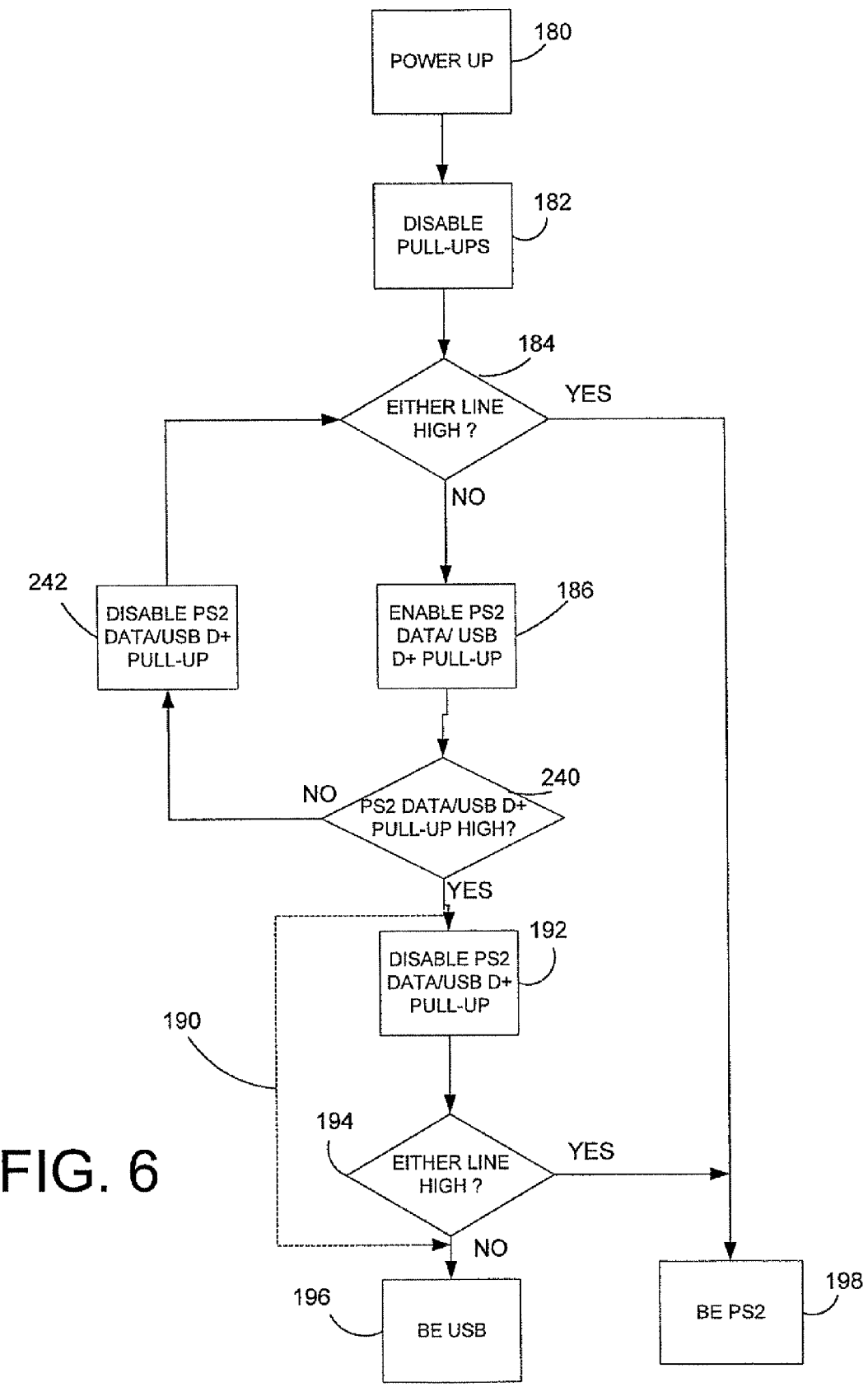
FIG. 6 is a block diagram illustrating operation of a peripheral device in accordance with another embodiment of the present invention.

FIG. 6 thus illustrates a flow diagram showing operation of the detection algorithm in a manner which is somewhat different from that shown in FIG. 4. Portions of FIGS. 4 and 6 are similar and are similarly numbered. However, after the PS2 DATA/USB D+ pull-up resistor 154 is enabled at block 186, it is determined whether either line is high. This is indicated by block 240. If so, processing continues at block 192 as described with respect to FIG. 4.

However, if, at block 240, it is determined that neither line is high, the system can simply wait until one of the conductors goes high and proceed at block 192 or 242. Alternatively, upon detecting that neither line is high, at block 240, the PS2 DATA/USB D+ pull-up resistor 154 is disabled. This is indicated by block 242, and processing reverts to block 184. Thus, a forced SE0 on a USB port, or a forced low PS2 Data line is treated as an indeterminate state, and the algorithm simply waits until that particular state or condition ends. It is believed that this delay will not last in excess of approximately 10 ms which will not likely be noticed by the user.

In an illustrative embodiment, the determination of the interface connection type can be done at power-up only, or it can be repeated upon software exception, such as might occur from a watchdog time out or an electrostatic discharge event, or it can be repeated at regular intervals during normal operation.

As with FIG. 4, the signals mentioned in FIG. 6 can be combined differently such that either the PS2 data or PS2 clock signals can be associated with either the USB D+ or USB D− signals. This type of system is contemplated to be within one illustrative embodiment of the present invention.

Thus, it can be seen that the present invention provides a method and apparatus by which a peripheral device can determine whether it is connected to a USB interface or a PS2 interface. The manufacturer of such peripheral devices need only support one product, rather than two separate products, yet will still accommodate connection to computers with both types of interfaces.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A peripheral device connectable to a computer having one of a first interface and a second interface, the first interface communicating with the peripheral device over a differential data connection including a first data conductor and a second data conductor, and the second interface communicating with the peripheral device over a single ended data connection, including a first data conductor, and a clock conductor, the peripheral device comprising:

first and second communication conductors connected to the first and second data conductors in the differential data connection when the computer includes the first interface, and connected to the first data conductor in the single ended data connection and the clock conductor when the computer includes the second interface;

an interface detection component, coupled to the first and second communication conductors, monitoring the first and second communication conductors to detect which of the first and second interfaces the peripheral device is connected to and to providing a connection output indicative of the detected interface; and a controller component, coupled to the interface detection component, communicating between the peripheral device and the computer over the first and second communication conductors according to a protocol corresponding to the detected interface based on the connection output.

2. The peripheral device of claim 1 wherein, when the computer includes the first interface, the first and second data conductors in the differential data connection in the computer are coupled to a first voltage potential with first and second resistive elements, respectively, and when the computer includes the second interface, the first data conductor in the single ended data connection and the clock conductor in the computer are pulled to a second voltage potential by third and fourth resistive elements, respectively, and wherein the interface detection component comprises:
- a signal detector coupled to the first and second communication conductors and detecting signal levels on the first and second communication conductors and providing the connection output based on the signal levels detected.

3. The peripheral device of claim 2 wherein the interface detection component comprises:
- a fifth resistive element; a sixth resistive element;
- a first selectable connection element selectively connecting the first communication conductor to a third voltage potential through the fifth resistive element; and
- a second selectable connection element selectively connecting the second communication conductor to the third voltage potential through the sixth resistive element.

4. The peripheral device of claim 3 wherein the second and third voltage potentials are associated with a first logic level.

5. The peripheral device of claim 4 further comprising the interface connection component deselecting the first and second selectable connection elements to disconnect the first and second communication conductors from the third voltage potential upon power-up of the peripheral device.

6. The peripheral device of claim 5 further comprising the signal detector detecting signal levels on the first and second communication conductors upon power-up of the peripheral device, when the first and second selectable connection elements are deselected and providing the connection output based on the signal levels.

7. The peripheral device of claim 6 further comprising the signal detector providing the connection output indicative of connection to the second interface when the signal level corresponding to at least one of the first and second communication conductors is at the first logic level.

8. The peripheral device of claim 7 further comprising the interface detection component selecting the first selectable connection element and deselecting the second connection element and the signal detector providing the connection output indicative of connection to the second interface when the signal level corresponding to the first communication conductor is at a second logic level corresponding to the first voltage potential.

9. The peripheral device of claim 8 further comprising the signal detector providing the connection output indicative of connection to the first interface when the signal level corresponding to the first communication conductor is at the first logic level.

10. The peripheral device of claim 8 further comprising the interface detection component deselecting the first selectable connection element and deselecting the second connection element and the signal detector providing the connection output indicative of connection to the first interface when the signal level corresponding to the first communication conductor is at the second logic level and providing the connection output indicative of connection to the second interface when the signal level corresponding to at least one of the first and second communication conductors is at the first logic level.

11. The peripheral device of claim 10 wherein the first logic level corresponds to a logic one and wherein the second logic level corresponds to a logic zero.

* * * * *